Aug. 30, 1938.  L. W. BURR  2,128,798
NAIL
Filed Oct. 2, 1936
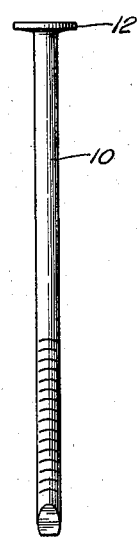
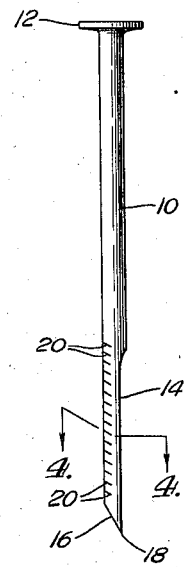
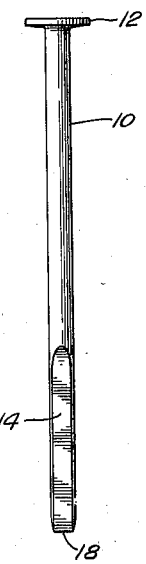
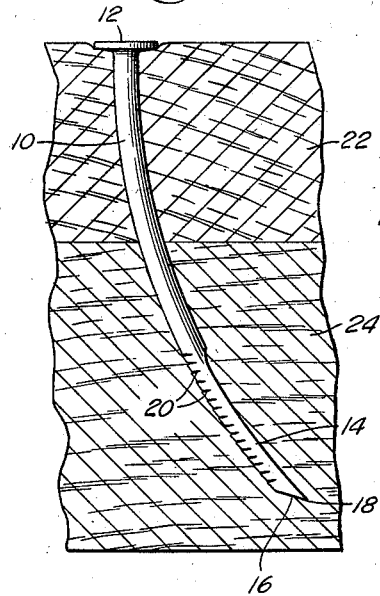
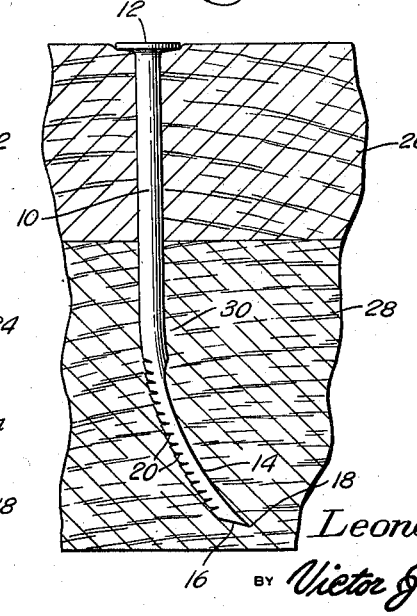
Leonard W. Burr.
INVENTOR
BY Victor J. Evans & Co.
HIS ATTORNEYS Patented Aug. 30, 1938

2,128,798

UNITED STATES PATENT OFFICE 2,128,798

NAIL

Leonard W. Burr, Walnut Grove, Minn.

Application October 2, 1936, Serial No. 103,781

1 Claim. (Cl. 85—31)

My invention relates to nails, and includes among its objects and advantages the provision of a construction which renders the nail self-clinching incident to being driven home.

In the accompanying drawing:

Fig. 1 is an elevational view of a nail embodying my invention;

Fig. 2 is an elevational view of the same nail turned 90°;

Fig. 3 is an elevational view of the same nail turned 90° in the opposite direction;

Fig. 4 is a sectional view along the line 4—4 of Fig. 1;

Fig. 5 is a view illustrating the manner in which the nail is self-clinching; and Fig. 6 is a similar view illustrating the manner in which a different clinching action may be attained.

In the embodiment selected to illustrate my invention, I make use of the usual shank 10 having a head 12 formed at one end thereof. The shank 10 is cut away at 14 to provide a flat face. The end of the shank includes a diagonal face 16 intersecting the face 14 to provide a chisel point 18. This point has a width coextensive with the width of the face 14.

The shank 10 opposite the face 14 is provided with a plurality of diagonal cuts 20 extending along the shank a distance substantially equal to the face 14. These cuts may be made through the medium of a gang of thin blades.

In operation, my nail may be driven in the usual manner. In Fig. 5, I illustrate the nail as being driven through a member 22 and into a member 24 for connecting two members. As the point 18 is driven into the member 22, the diagonal face 16 will tend to deflect the direction of travel. During continued driving of the nail, the diagonal face 16 will cause the nail to be bent in the manner illustrated in Fig. 5. In removing material, as indicated at 14, the shank will be slightly weakened so as to cooperate with the diagonal face 16 for bending purposes. In making the slots 20 diagonal, as illustrated in Fig. 1, the slotted extension of the nail offers no resistance to driving, but when the nail is driven home, the curvature of the slotted extension causes the slots 20 to open slightly, as illustrated in Fig. 5. Because of such opening, the slotted feature provides a toothed surface which cooperates with the clinched nail for holding purposes. The toothed surface will become firmly embedded in the wood so as to resist withdrawal.

In Fig. 6, I illustrate the manner in which the nail may be clinched only at its slotted end. In this case member 26 and the member 28 are bored down to a point indicated approximately at 30. The nail being driven into the bore will take a straight path until the end of the bore is reached, after which the diagonal face 16 will deflect the course of the nail for clinching the slotted extension only. In both systems of driving, the opening of the slots provides teeth which increase the holding action of the nail in a large degree. The face 14 offers a certain amount of resistance to the deflecting action of the diagonal face so that the nail will not clinch too rapidly, but will clinch a sufficient degree to greatly enhance the holding efficiency of the nail.

Without further elaboration, the foregoing will so fully explain my invention that others may, by applying current knowledge, readily adapt the same for use under various conditions of service.

I claim:

A nail comprising a shank having a head at one end, said shank being circular in cross section and having a weakened extension semicircular in cross section, said extension having a diameter equal to said shank and the flat face of the extension being parallel to the longitudinal axis of the shank, the curvature of the extension opposite the flat face thereof being slotted substantially transversely of the extension, the end of the extension having an angular face so arranged as to bend the extension about its flat face when the nail is driven.

LEONARD W. BURR.